United States Patent Office 3,522,306
Patented July 28, 1970

3,522,306
HALOAMINO DERIVATIVES OF ADAMANTANE
AND ALKYLADAMANTANES AND PROCESS
FOR PRODUCING SAME
Gary L. Driscoll, Boothwyn, Pa., assignor to Sun Oil
Company, Philadelphia, Pa., a corporation of New
Jersey
No Drawing. Filed July 12, 1967, Ser. No. 652,715
Int. Cl. C07c 85/00, 87/40
U.S. Cl. 260—563
12 Claims

ABSTRACT OF THE DISCLOSURE

Compounds, namely, N,N-dihalo-1-amino- and N,N,N',N'-tetrahalo-1,3-diamino adamantanes and alkyladamantanes, are produced by heating N-halo-1-amino-, or N,N'-dihalo-1,3-diamino-, adamantane or alkyladamantane in non-aqueous, non-protonic solvent media. The compounds are useful halogenating agents and possess disinfectant properties.

BACKGROUND OF THE INVENTION

The cage-like structure of the adamantane nucleus has been illustrated in several ways, of which the following is one example:

As can be seen, it consists of three condensed cyclohexane rings arranged so that there are four bridgehead carbon atoms which are equivalent to each other.

The preparation of methyl- and/or ethyl-substituted adamantanes by the isomerization of tricyclic naphthenes by means of an aluminum halide or HF-BF$_3$ catalyst has been described in several references including the following: Schneider U.S. Pat. No. 3,128,316; Janoski et al. U.S. Pat. No. 3,275,700; Schleyer et al., Tetrahedron Letters No. 9, pp. 305–309 (1961); and Schneider et al., JACS, vol. 86, pp. 5365–5367 (1964). The isomerization products can have the methyl and/or ethyl groups attached to the adamantane nucleus at either bridgehead or non-bridgehead positions or both, although completion of the isomerization reaction favors bridgehead substitution. Examples of alkyladamantanes made by such isomerization are methyladamantanes, dimethyladamantanes, ethyladamantanes, methylethyladamantanes, dimethylethyladamantanes, trimethyladamantanes and tetramethyladamantanes.

Preparation of adamantane hydrocarbons having higher alkyl groups has been disclosed by Spengler et al., Erdöl und Kohle-Erdgas-Petrochemie, vol. 15, pp. 702–707 (1962). These authors used a Wurtz synthesis involving the reaction of 1-bromoadamantane with alkali metal alkyls to interchange the alkyl group for the bromine substituent. In this manner 1-n-butyladamantane and 1-n-hexyladamantane were prepared.

Recently Hoek et al., 85 (1966) Recueil 1045–1053, have described a different route for the preparation of butyl-substituted adamantane. The procedure involved reacting either 1-bromoadamantane or 2-bromoadamantane with thiophene using SnCl$_4$ as catalyst in the presence of excess thiophene as solvent to produce adamantylthiophenes and then hydrogenating the adamantylthiophenes to yield butyl-substituted adamantanes.

Monoamino and diamino adamantanes and alkyladamantanes have various sources in the art. As to such alkyladamantanes, reference is made to Schneider U.S. Pat. No. 3,258,498, wherein the corresponding hydrocarbon is reacted with nitrogen dioxide to obtain a nitro or dinitro derivative, which is then reduced to obtain the corresponding amino compound.

The production of N-bromo-1-adamantane hydrobromide by treatment in aqueous media of 1-aminoadamantane with liquid bromine is described in Derwent Pharm. Documentation (1964) Basic No. 14,989, Eire 342/64, pages 441–445. Similar procedure is available for the production, from the corresponding amino or diamino adamantanes or alkyladamantanes, of haloamino substituted adamantane hydro halides generally, including N-halo-1-amino adamantane hydrohalides other than the bromo derivative, N-halo-1-amino alkyladamantane hydrohalides, N,N'-di-halo-1,3-diaminoadamantane hydrohalides, and N,N'-di-halo-1,3-diaminoalkyladamantane hydrohalides. The corresponding haloamino derivatives of adamantanes in non-salt form can be recovered from their hydrohalide salts by treatment with aqueous alkaline media, e.g., aqueous NaOH, or can be produced directly by use, instead of elemental halogen, of a halogen-yielding aqueous alkaline solution or dispersion, such as an aqueous solution of sodium hypochlorite, hypobromite, or hypoiodite, or an aqueous dispersion of calcium hypochlorite.

These haloamino derivatives of adamantane, including alkyladamantanes, hydrolyze at least in part in water, reverting to the corresponding amine, and yielding HOX, wherein X is the particular halide present. Moreover, these haloamino derivatives are unstable when damp, which, at higher temperatures, e.g., upwards of 50° C. not infrequently leads to vigorous decomposition.

In the case of N-halo-1-amino reactants in the practice of the present invention, the 3-position on the adamantane nucleus can be occupied by hydrogen or an alkyl group preferably having not more than 10 carbon atoms.

SUMMARY OF THE INVENTION

The invention resides in new compounds having the formula:

wherein A represents a hydrocarbon moiety consisting of the adamantane nucleus with 0–3 alkyl substituents containing a total of not more than 20 carbon atoms; —NX$_2$ is a bridgehead substituent wherein X is chlorine, bromine or iodine; and wherein B is a bridgehead substituent from the group consisting of hydrogen, alkyl having 1–10 carbon atoms, and —NX$_2$.

The hydrocarbon moiety A of the foregoing compounds can correspond to adamantane, or to an alkyladamantane having 1–3 alkyl groups and 11–30 total carbon atoms (1–20 total alkyl carbon atoms). Preferably these new compounds have a total of 0–10 alkyl carbon atoms. The alkyl group or groups can be attached to the adamantane nucleus at either bridgehead or non-bridgehead positions or both. Also preferably, an alkyl group contains no more than 10 carbon atoms, and still more preferably, not more than 5 carbon atoms.

Examples of products according to the present invention are the relevant derivatives of the following hydrocarbons: adamantane; 1-methyl or 2-methyladamantane; 1-ethyl or 2-ethyladamantane; 1,2-dimethyl or 1,3-dimethyladamantane; 1-methyl-3-ethyladamantane; diethyladamantanes; 1-n-propyl or 1-isopropyladamantane; 1-n-butyladamantane; 1,3-di-n-pentyladamantane; 1-methyl-3-heptyladamantane; 1-n-decyladamantane; 1-n-decyl-3-ethyladamantane; 1-methyl-2-propyladamantane; 1-iso-hexyladamantane; 1-eicosyladamantane; and the like.

Preferred products of the invention are the N,N,N',N'-tetrahalo-1,3-diamino-5,7-dialkyladamantanes having not more than 10 total carbon atoms in the two alkyl groups, and still more preferably in which the alkyl groups are methyl and/or ethyl.

The invention also resides in a process for producing the foregoing new compounds, which comprises heating, such as between 60–175° C., in non-aqueous, non-protonic media, preferably under total reflux distillation conditions, a compound having the formula:

C—A—NHX wherein A represents a hydrocarbon moiety as defined above; —NHX is a bridgehead substituent wherein X is chlorine, bromine or iodine; and wherein C is a bridgehead substituent from the group consisting of hydrogen, alkyl having 1–10 carbon atoms, and —NHX.

Examples of non-aqueous, non-protonic media are benzene, toluene, xylene, dichlorobenzene, chlorobenzene, octane, heptane and cyclohexane.

The new compounds of the invention are vigorous halogenating, as well as halogen-yielding, agents useful for the many purposes for which such agents are in demand. For example, the chlorine compound chlorinates aniline rapidly at 0° C., and also demonstrates highly effective disinfectant properties in aqueous media. The bromine, and iodine compounds likewise halogenate aniline under like conditions, and also demonstrate highly effective disinfectant properties.

DESCRIPTION OF THE PREFERRED EMBODIMENTS

In a typical reaction for the preparation of the starting haloamino reactant, 1,3-diamino-5,7-dimethyladamantane is stirred with an aqueous solution of sodium hypochlorite at a suitable temperature, such as between −20 and +50° C., whereupon N,N′-dichloro-1,3-diamino-5,7-dimethyladamantane is formed in high yield.

This N-chloro derivative is a stable, white solid at room temperature. In water it hydrolyzes in part to diamine and HOCl. At higher temperatures, e.g., above 50° C., it is unstable when damp, sometimes leading to vigorous decomposition.

This same product is obtained when employing an aqueous dispersion of calcium hypochlorite in place of sodium hypochlorite, and the corresponding N-bromo or N-iodo derivative is obtained when employing aqueous sodium hypobromite or aqueous sodium hypoiodite, respectively.

By heating, e.g., under total reflux distillation conditions, the N-chloro derivative in a non-aqueous, non-protonic solvent, e.g., benzene, in a system anhydrous, at least for practical purposes, the —NHCl substituents are converted to —NCl$_2$ substituents to yield a vigorous chlorinating agent, e.g., for chlorinating aniline, leading to the same products as a reaction of sodium hypochlorite with aniline. Thus, in this manner N,N′-dichloro-1,3-diamino-5,7-dimethyladamantane is converted to N,N,N′,N′-tetrachloro-1,3-diamino-5,7-dimethyladamantane.

This particular derivative is also a stable, white solid at room temperature, but higher temperatures, e.g. above 150° C., convert it to 1,3-dichloro-5,7-dimethyladamantane, presumably by splitting out NCl.

The starting materials employed in the practice of the invention may be produced in any desired manner, and have any desired source.

The reaction, broadly speaking, can be illustrated by an equation as follows:

$$2(C-A-NHX) \xrightarrow[\substack{\text{non-aqueous} \\ \text{non-protonic} \\ \text{solvent}}]{\text{heat}} B-A-NX_2 + D-A-NH_2$$

wherein A, B and C are as hereinbefore defined and D is a bridgehead substituent from the group consisting of hydrogen, alkyl having 1–10 carbon atoms, and —NH$_2$.

The compounds corresponding to B—A—NX$_2$ are generally soluble in non-aqueous, non-protonic solvents, whereas compounds corresponding to D—A—NH$_2$, which usually are present in the form of their hydrohalide salts, generally are not. Separation of the latter from the former thus is conveniently accomplished by precipitation of the latter, which may be assisted if desired, or necessary, by adding the hydrohalide corresponding to the halide present.

The corresponding —NBr$_2$ or —NI$_2$ derivatives are obtained by similarly treating the initial N-bromo derivatives or N-iodo derivatives, in a non-protonic solvent, e.g., benzene under anhydrous conditions. The product is a vigorous brominating agent, or a vigorous iodizing agent, respectively.

Similar results are obtained when no alkyl substituents are present in the starting haloamino reactant, when alkyl substituents are 1–4 in number and occupy bridgehead or non-bridgehead positions, or both, and when the alkyl substituents, taken individually, contain one or more than one carbon atom. Examples of alkyl substituents are methyl, ethyl, propyl, butyl, pentyl, hexyl, heptyl, octyl, nonyl, and decyl, including the various isomers thereof. The alkyl substituents when present thus may be the same or different, to yield products correspondingly alkyl substituted.

Example I illustrates the preparation of haloamino reactants.

Example I 7.8 g. (0.04 mole) of 1,3-diamino-5,7-dimethyladamantane and 30 ml. of water were placed in a beaker to which were added with stirring 70 ml. of a 5% aqueous solution of sodium hypochlorite. Stirring was continued for 30 minutes, whereupon the white solid that formed was separated by filtration, and dried under vacuum at room temperature. The yield was 9.2 g. (95%). Analysis, including use of the infrared spectrum method, definitely identified the product as 1,3-bis(N-chloroamino)-5,7-dimethyladamantane, also designatable as N,N′-dichloro-1,3-diamino-5,7-dimethyladamantane.

Example II illustrates the preparation of the new compounds of the invention.

Example II

One gram of the product of Example I was dissolved 10 ml. of benzene, and the solution was heated under total reflux distillation conditions. A white solid formed (about 0.3 g.) which was removed by filtration and identified as the dihydrochloride salt of 1,3 - diamino-5,7-dimethyladamantane. Evaporation of benzene from the filtrate yielded another white solid. Analysis, including use of the infrared spectrum method, identified this latter product as 1,3-bis(dichloroamino) - 5,7 - dimethyladamantane, also designatable as N,N,N′,N′ - tetrachloro-1,3-diamino-5,7-dimethyladamantane.

The latter product is unstable in the present of moisture, being thereby converted back to the starting material of this Example II, which latter starting material, incidentally, in the presence of larger amounts of moisture is converted back to the starting material of Example I, yielding in each instance the corresponding halogen. Thus, the importance of anhydrous conditions, at least for practical purposes, cannot be overemphasized in the preparation of the products of the invention.

The product of Example II, when injected on a vapor phase chromatograph column (10% G.E. SF–96 silicone oil on Chromasorb W) resulted in a single peak identified by infrared and nuclear magnetic resonance spectra as 1,3-dichloro - 5,7 - dimethyladamantane. This apparently arises from vapor phase rearrangement.

Similar results are obtained in the above examples when alkyl substituents on the nucleus of the starting material are other than as illustrated, are 0–3 in number, and conform in carbon content to specifications set forth above. Likewise, similar results are obtained when bromine or iodine take the place of chlorine in the reactants and products.

I claim:
1. A compound having the formula:

B—A—NX$_2$ wherein A represents a hydrocarbon moiety consisting of the adamantane nucleus with 0–3 alkyl substituents containing a total of not more than 20 carbon atoms; —NX$_2$ is a bridgehead substituent wherein X is chlorine, bromine or iodine; and B is a bridgehead substituent from the group consisting of hydrogen, alkyl having 1–10 carbon atoms, and —NX$_2$.

2. A compound according to claim 1 wherein the adamantane nucleus has 1–3 alkyl substituents containing a total of not more than 10 carbon atoms, and wherein B is —NX$_2$.

3. A compound according to claim 2 wherein the adamantane nucleus contains two alkyl groups, each positioned at a bridgehead position and containing not more than 5 carbon atoms.

4. A compound according to claim 3 wherein each alkyl group contains not more than 2 carbon atoms.

5. A compound according to claim 4 wherein X is chlorine.

6. A compound according to claim 5 wherein each alkyl group is methyl.

7. A process which comprises heating to a temperature in the range of 60 to 175° C. in non-aqueous, non-protonic solvent medium a compound having the formula:

C—A—NHX wherein A represents a hydrocarbon moiety consisting of the adamantane nucleus with 0–3 alkyl substituents containing a total of not more than 20 alkyl carbon atoms; —NHX is a bridgehead substituent wherein X is chlorine, bromine, or iodine; and wherein C is a bridgehead substituent from the group consisting of hydrogen, alkyl having 1–10 carbon atoms and —NHX.

8. The process of claim 7 wherein C is —NHX.

9. The process of claim 8 wherein the alkyl substituents are two in number, each being a bridgehead substituent and containing not more than 5 carbon atoms.

10. The process of claim 9 wherein heating is under total reflux distillation conditions.

11. The process of claim 9 wherein X is chlorine.

12. The process of claim 11 wherein each alkyl substituent is methyl.

References Cited

Du Pont: "Derwent Pharm. Documentation" (1964), basic No. 14,989, Eire 342/64, pp. 441–445.

CHARLES B. PARKER, Primary Examiner

D. R. PHILLIPS, Assistant Examiner

U.S. Cl. X.R.

260—577, 648; 424—325